US012545043B2

(12) United States Patent
Nagashima et al.

(10) Patent No.: US 12,545,043 B2
(45) Date of Patent: Feb. 10, 2026

(54) PRINTING APPARATUS

(71) Applicant: SEIKO EPSON CORPORATION, Tokyo (JP)

(72) Inventors: Yutaka Nagashima, Matsumoto (JP); Yusuke Kato, Shiojiri (JP); Nobuaki Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 18/522,713

(22) Filed: Nov. 29, 2023

(65) Prior Publication Data

US 2024/0181793 A1 Jun. 6, 2024

(30) Foreign Application Priority Data

Dec. 1, 2022 (JP) ................................ 2022-192617

(51) Int. Cl.
*B41J 29/13* (2006.01)

(52) U.S. Cl.
CPC .................................... *B41J 29/13* (2013.01)

(58) Field of Classification Search
CPC ... B41J 29/13; B41J 29/02; B41J 11/00; B41J 2/01; B41J 29/393
See application file for complete search history.

(56) References Cited

U.S. PATENT DOCUMENTS

2002/0186399 A1* 12/2002 Nakajima ................ B41J 29/38 358/1.14
2006/0170831 A1* 8/2006 Muraki ...................... B41J 3/46 349/1
2007/0138193 A1* 6/2007 Aono ....................... B41J 29/02 220/810
2007/0211131 A1* 9/2007 Iijima .................... B41J 2/1752 347/108
2019/0126629 A1* 5/2019 Kudo ................... B41J 2/17553
2022/0227151 A1* 7/2022 Nishijima ................ B41J 29/13

FOREIGN PATENT DOCUMENTS

JP 2022-103095 A 7/2022

* cited by examiner

*Primary Examiner* — Shelby L Fidler
*Assistant Examiner* — Tracey M McMillion
(74) *Attorney, Agent, or Firm* — WORKMAN NYDEGGER

(57) ABSTRACT

A printing apparatus includes a head configured to perform printing on a medium and an outer packaging configured to accommodate the head, in which the outer packaging includes an open-close cover that constitutes a portion of an upper surface of the outer packaging, and the open-close cover is configured so as to be able to rotate upward with an one end side being a fulcrum, and include an inner-side handle provided at an inner side of the open-close cover.

6 Claims, 8 Drawing Sheets

PRINTING APPARATUS

The present application is based on, and claims priority from JP Application Serial Number 2022-192617, filed on Dec. 1, 2022, the disclosure of which is hereby incorporated by reference herein in its entirety.

BACKGROUND

1. Technical Field

The present disclosure relates to a printing apparatus.

2. Related Art

JP-A-2022-103095 discloses a printer including an open-close cover provided with a handle. The printer is given as one example of a printing apparatus.

In a case of the printing apparatus described in JP-A-2022-103095, a user holds a handle by a hand to lift it, thereby being able to open the open-close cover. In a state in which the open-close cover is open, the handle is positioned higher than the open-close cover, and faces upward of the printing apparatus. Thus, when closing the open-close cover, the user is forced to perform an operation of extending its hand above the open-close cover, and then, turning its hand around the handle from above the open-close cover. In a case of the existing printing apparatus, there is room for improvement in terms of handling of the open-close cover.

SUMMARY

A printing apparatus includes a head configured to perform printing on a medium, and an outer packaging configured to accommodate the head, in which the outer packaging includes an open-close cover that constitutes a portion of an upper surface of the outer packaging, and the open-close cover is configured to rotate upward with one end side being a fulcrum, and include an inner-side handle provided at an inner side of the open-close cover.

DESCRIPTION OF EXEMPLARY EMBODIMENT

Figure 1:
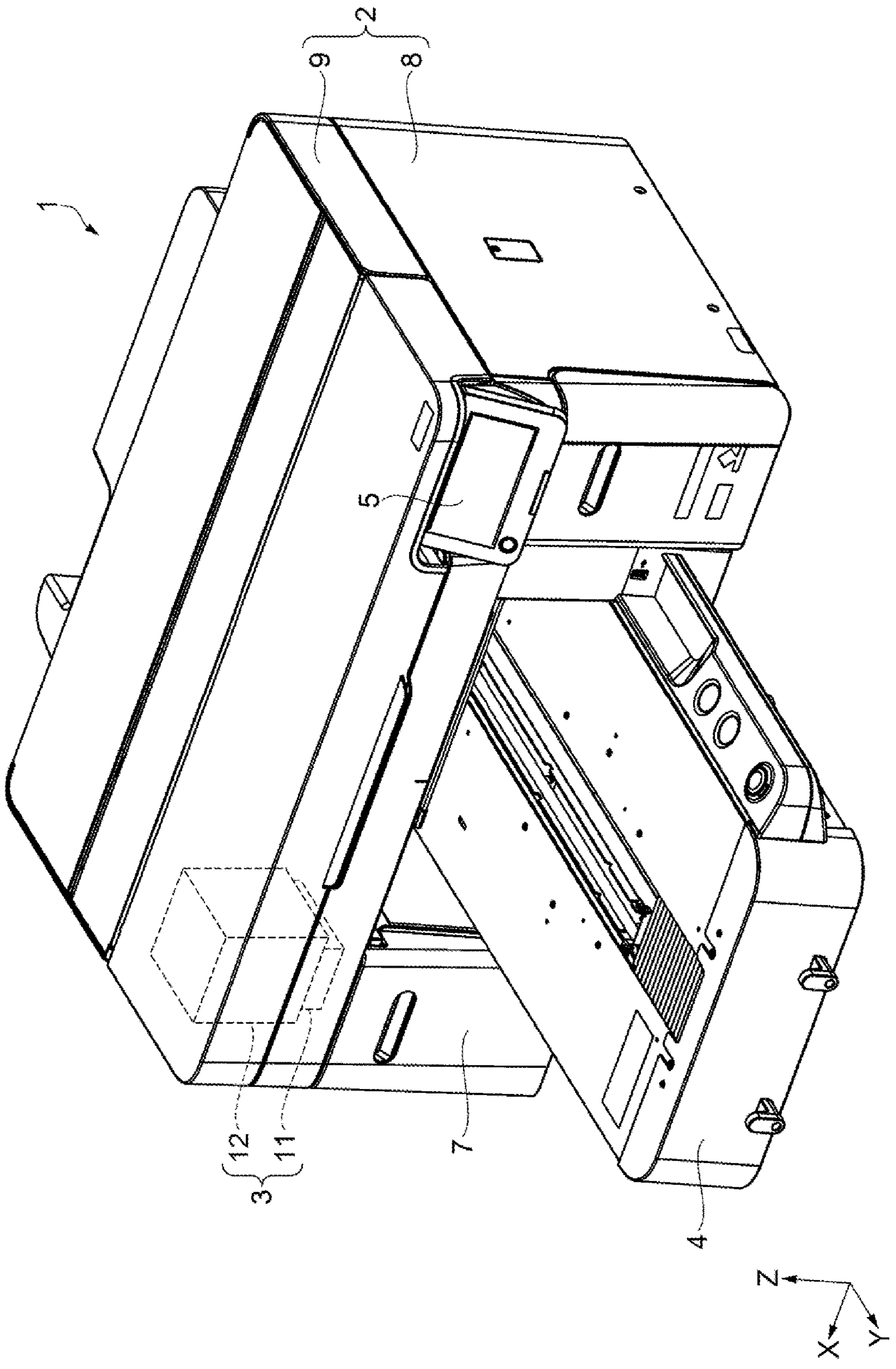
FIG. 1 is a perspective view illustrating a printing apparatus.

The printing apparatus 1 includes an outer packaging 2, a printing unit 3, a medium transport unit 4, and an operating panel 5, as illustrated in FIG. 1. The outer packaging 2 constitutes the outer shell of the printing apparatus 1. The printing unit 3 is accommodated in the outer packaging 2.

The medium transport unit 4 protrudes from the inside of the outer packaging 2 to the outside of the outer packaging 2. Of side surfaces of the outer packaging 2, a side surface from which the medium transport unit 4 protrudes is a front surface 7 of the printing apparatus 1. The operating panel 5 is disposed at the front surface 7. The operating panel 5 receives an instruction through various types of operations concerning the printing apparatus 1. The outer packaging 2 includes a first outer packaging 8 and a second outer packaging 9. The front surface 7 at which the operating panel 5 is disposed serves as one example of a side surface of the outer packaging 2.

In FIG. 1, the X-axis, the Y-axis, and the Z-axis are illustrated. The X-axis, the Y-axis, and the Z-axis are coordinate axes perpendicular to each other. In FIG. 1 and the following drawings, the X-axis, the Y-axis, and the Z-axis are also illustrated on an as-necessary basis. In this case, the X-axis, the Y-axis, and the Z-axis correspond to the X-axis, the Y-axis, and the Z-axis in FIG. 1, respectively. FIG. 1 illustrates a state in which the printing apparatus 1 is disposed at an X-Y plane defined by the X-axis and the Y-axis. In the present embodiment, a usage state of the printing apparatus 1 is a state in which the printing apparatus 1 is disposed at the X-Y plane in a state in which the X-Y plane matches a horizontal flat surface. The posture of the printing apparatus 1 when the printing apparatus 1 is disposed at the X-Y plane that matches the horizontal surface is referred to as a usage posture of the printing apparatus 1.

In the following description, when the X-axis, the Y-axis, and the Z-axis are illustrated in the drawing or mentioned in relation to a constituent part or unit of the printing apparatus 1, the X-axis, the Y-axis, and the Z-axis indicate axes in a state in which the constituent part or unit is installed in the printing apparatus 1. In addition, the posture of the constituent part or unit of the printing apparatus 1 at the usage posture is referred to a usage posture of the constituent part or unit. In addition, in the following description concerning the printing apparatus 1 or its constituent element or unit or the like, such a description is made on the assumption that the printing apparatus 1 or its constituent element or unit or the like is disposed at the usage posture.

Note that, in a situation where the printing apparatus 1 is actually used, it is only necessary that the horizontal surface is a surface that is substantially horizontal. This substantial horizon includes, for example, a slope that falls within a range of slope permitted for the surface where the printing apparatus 1 is disposed when in use. Thus, the substantially horizontal surface is not limited, for example, to a highly precisely formed surface such as a machine plate. The substantially horizontal surface includes, for example, various types of surfaces of a desk, a stage, a shelf, a floor, or the like at which the printing apparatus 1 is disposed when in use. In addition, the vertical direction is not limited to a distance extending exactly along the gravitational direction, and includes a direction perpendicular to the substantially horizontal surface. Thus, when the substantially horizontal surface is, for example, a surface of a desk, a stage, a shelf, a floor, or the like, the vertical direction represents the direction perpendicular to these surfaces.

An arrow is attached to each of the X-axis, the Y-axis, and the Z-axis. In each of the X-axis, the Y-axis, and the Z-axis, the arrowed direction indicates a direction of + (positive), and a direction opposite from the arrowed direction indicates a direction of − (negative). The Z-axis is an axis perpendicular to the X-Y plane. In the usage state of the printing apparatus 1, the + Z direction is a vertically upward direction. In the usage state of the printing apparatus 1, the −Z direction is a vertically downward direction in FIG. 1.

Note that the printing unit 3 reciprocates along the X-axis. Thus, the X-axis is defined as a direction in which the printing unit 3 reciprocates. The printing unit 3 includes a printing head 11 and a carriage 12. The printing head 11 discharges ink toward a printing medium. The printing head 11 is mounted at the carriage 12. The carriage 12 reciprocates along the X-axis. As the carriage 12 reciprocates along the X-axis, the printing head 11 reciprocates along the X-axis.

The medium transport unit 4 protrudes in the +Y direction from the outer packaging 2. The +Y direction is a direction in which the medium transport unit 4 protrudes from the outer packaging 2. The medium transport unit 4 is disposed at the −Z direction of the printing unit 3. The second outer packaging 9 is disposed at the −Z direction of the first outer packaging 8. The medium transport unit 4 protrudes from the inside of the first outer packaging 8 toward the outside of the first outer packaging 8.

Figure 2:
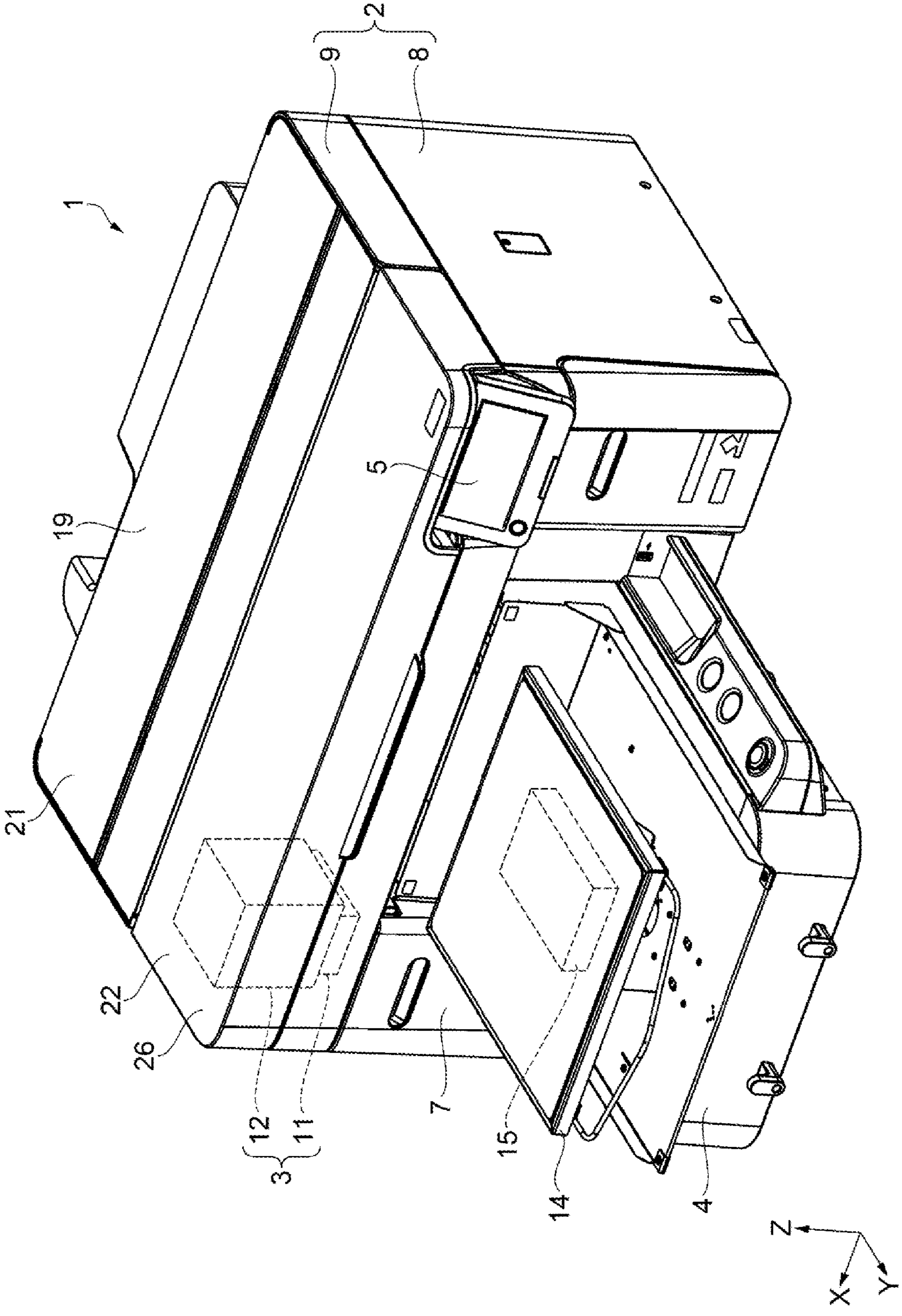
FIG. 2 is a perspective view illustrating the printing apparatus.

The medium transport unit 4 includes a tray 14 and a stage 15, as illustrated in FIG. 2. The tray 14 supports the printing medium. The tray 14 serves as one example of a medium support portion. The stage 15 supports the tray 14. The tray 14 is disposed at the +Z direction of the stage 15. With the medium transport unit 4, the stage 15 reciprocates along the Y-axis. With this configuration, the tray 14 reciprocates along the Y-axis. With the medium transport unit 4, the tray 14 reciprocates between the outside of the outer packaging 2 and the inside of the outer packaging 2. FIG. 2 illustrates a state in which the tray 14 is disposed at the outside of the outer packaging 2. FIG. 1 illustrates a state in which the tray 14 is disposed at the inside of the outer packaging 2.

As illustrated in FIG. 2, when the tray 14 is disposed outside of the outer packaging 2, the printing medium is set at the tray 14. The printing medium set at the tray 14 is transported to the inside of the outer packaging 2 by the medium transport unit 4. The printing apparatus 1 performs an operation of causing ink to be discharged from the printing head 11, and also perform an operation of moving the tray 14 in the +Y direction by a predetermined amount, thereby performing printing on the printing medium. At this time, the printing apparatus 1 causes ink to be discharged from the printing head 11 while causing the carriage 12 to reciprocate along the X-axis.

The second outer packaging 9 constitutes an upper surface 19 of the outer packaging 2. The upper surface 19 faces the +Z direction. The second outer packaging 9 includes a cover body portion 21 and an open-close cover 22. The open-close cover 22 constitutes a portion of the upper surface 19. The open-close cover 22 is configured so as to be able to rotate relative to the cover body portion 21.

Figure 3:
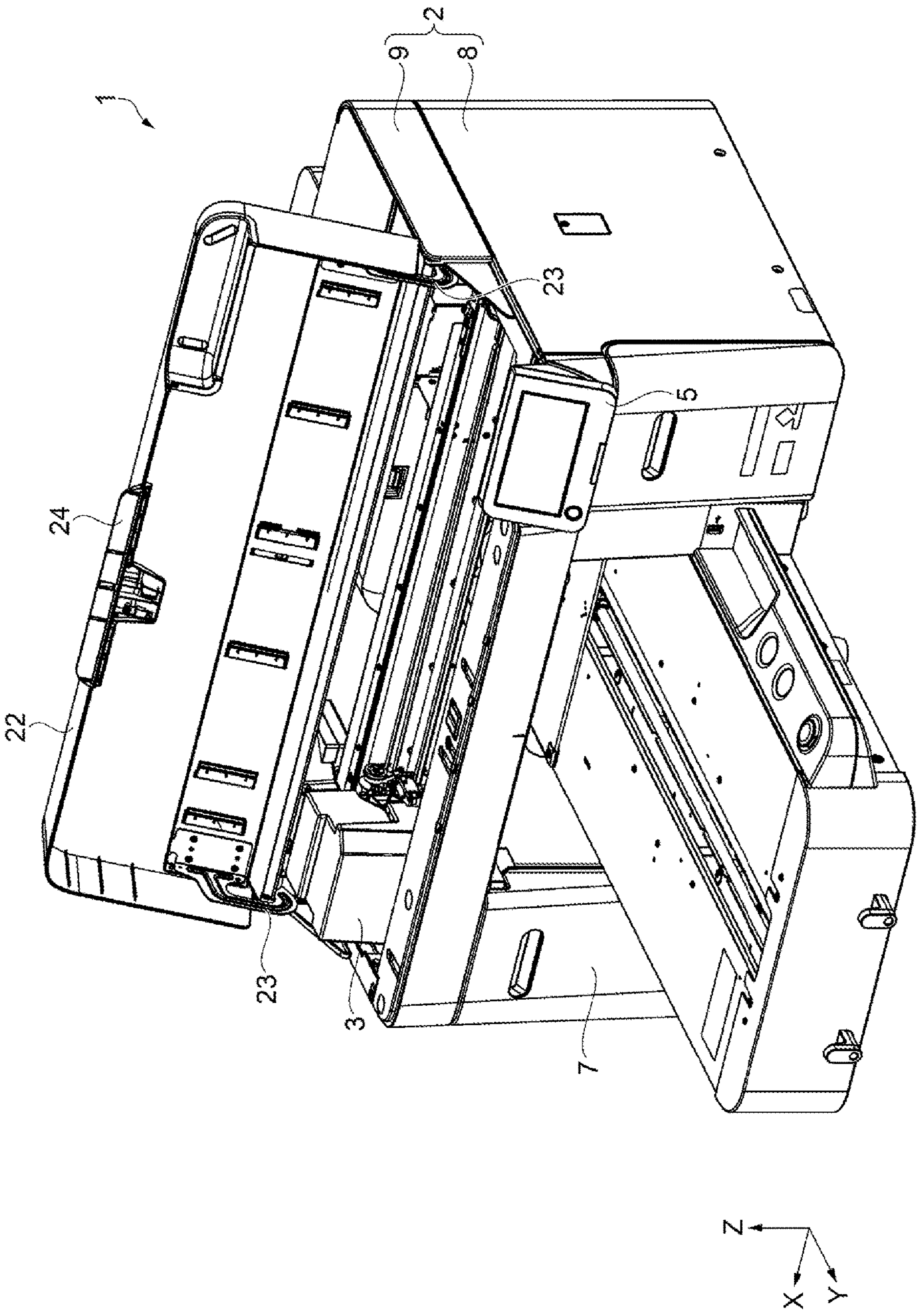
FIG. 3 is a perspective view illustrating the printing apparatus.
Figure 4:
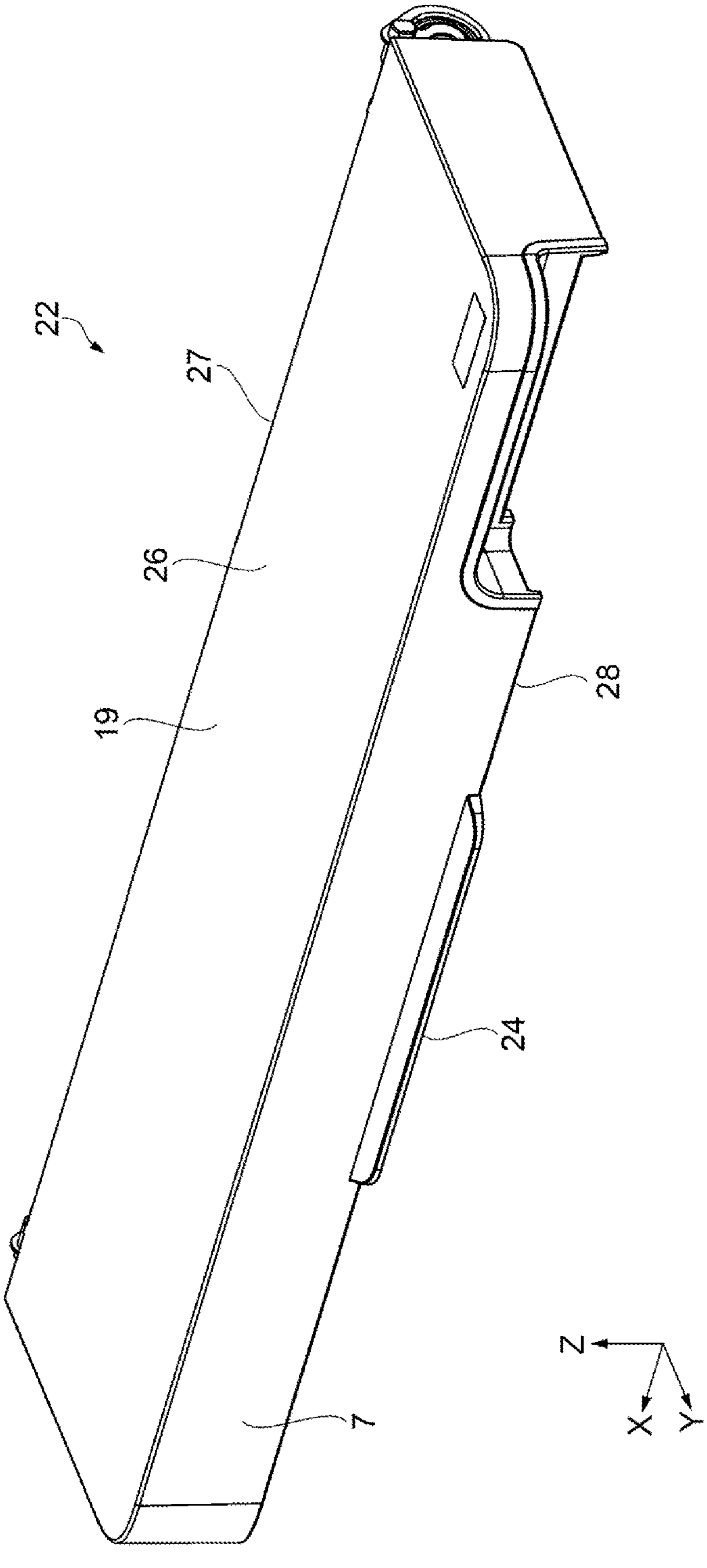
FIG. 4 is a perspective view illustrating an open-close cover.

The open-close cover 22 is configured so as to be able to rotate with a hinge 23, as illustrated in FIG. 3. The open-close cover 22 includes the hinge 23 provided at one-end side. The open-close cover 22 is configured to be able to rotate upward with the one-end side being the fulcrum. FIG. 3 illustrates a state in which the open-close cover 22 is opened. As the open-close cover 22 is opened, a user is able to access the printing unit 3 accommodated in the outer packaging 2. The rotational movement shaft of the open-close cover 22 extends along the X-axis. The rotational movement shaft of the open-close cover 22 is disposed at the −Y direction of the front surface 7 of the printing apparatus 1. The open-close cover 22 includes a handle 24. The handle 24 protrudes in the +Y direction from the front surface 7 of the open-close cover 22, as illustrated in FIG. 4. The handle 24 is disposed at or around the center of the open-close cover 22 in the X direction and at an end of the −Z direction. The handle 24 is elongated along the X direction, protrudes toward the +Y direction by a length shorter than that in the X direction, and has a length in the Z direction shorter than the length in the Y direction. The handle 24 protrudes in the +Y direction by a length long enough for a person to put its finger over the handle. The handle 24 serves as one example of an outer-side handle, and also serves as one example of a protrusion portion that protrudes from the open-close cover 22. By lifting upward the handle 24 of the open-close cover 22 in a state in which the open-close cover 22 is closed, a user is able to open the open-close cover 22.

Figure 5:
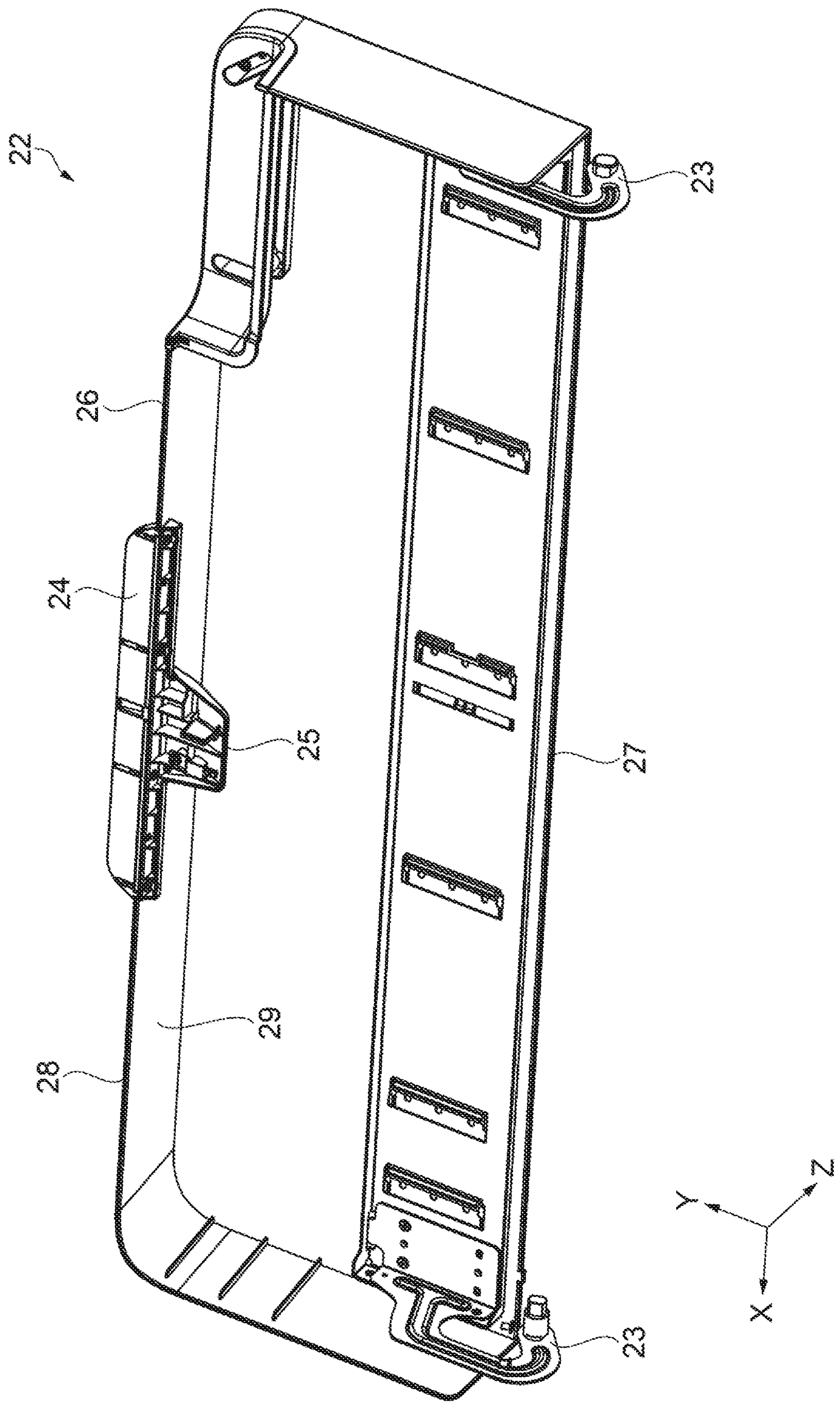
FIG. 5 is a perspective view illustrating the open-close cover.

The open-close cover 22 includes the hinge 23, the handle 24, a second handle 25, and a lid member 26, as illustrated in FIG. 5. The second handle 25 serves as one example of an inner-side handle. The handle 24 and the second handle 25 are provided at the lid member 26. The lid member 26 is a member of the outer packaging 2 configured to cover the printing unit 3 from the +Z direction, as illustrated in FIG. 2. The hinge 23 illustrated in FIG. 5 is coupled to the lid member 26. The hinge 23 is disposed at the one end 27 side in the −Y direction of the lid member 26.

As illustrated in FIG. 4, the lid member 26 includes a front side wall 28. The front side wall 28 is a portion within a region of a side wall that is provided along the X-Z plane and extends downward in the −Z direction from the upper surface 19. The front side wall 28 intersects the upper surface 19. The front side wall 28 extends downward in the −Z direction from the upper surface 19. The front surface 7 is a surface of the front side wall 28 that faces the +Y direction. The handle 24 is provided at the front surface 7. As illustrated in FIG. 5, the front side wall 28 is disposed at the other end of the lid member 26 that is the opposite side from the one end 27. The front side wall 28 is the other end of the open-close cover 22. The front side wall 28 is disposed at an end portion, in the +Y direction, of the lid member 26. An inner side surface 29 is a surface of the front side wall 28 that faces the −Y direction. The inner side surface 29 corresponds to a back of the front surface 7 illustrated in FIG. 4.

As illustrated in FIG. 5, the second handle 25 is provided at the inner side surface 29. The second handle 25 protrudes in the −Y direction from the inner side surface 29 of the open-close cover 22. The second handle 25 is disposed at or around the center of the open-close cover 22 in the X direction and at an end of the −Z direction. The length of protruding in the −Y direction of the second handle 25 is longer than the length of protruding in the +Y direction of the handle 24. The second handle 25 is provided at the front side wall 28 that is the other end of the open-close cover 22. By pulling, in the +Y direction illustrated in FIG. 3, the second handle 25 in a state in which the open-close cover 22 is open, a user is able to close the open-close cover 22. As illustrated in FIG. 5, the second handle 25 is disposed at the other end side that is at the opposite side from the one end 27 side serving as the rotational fulcrum of the open-close cover 22. That is, the second handle 25 is disposed at the other end side that is at the opposite side from the one end 27 side. This makes it possible to close the open-close cover 22 with reduce power, as compared with a case where the second handle 25 is disposed at a position closer to the one end 27 than the inner side surface 29. In addition, a user does not need to turn its hand around the outer side of or the upper side of the open-close cover 22, which makes it easy to perform an open-close operation.

Figure 6:
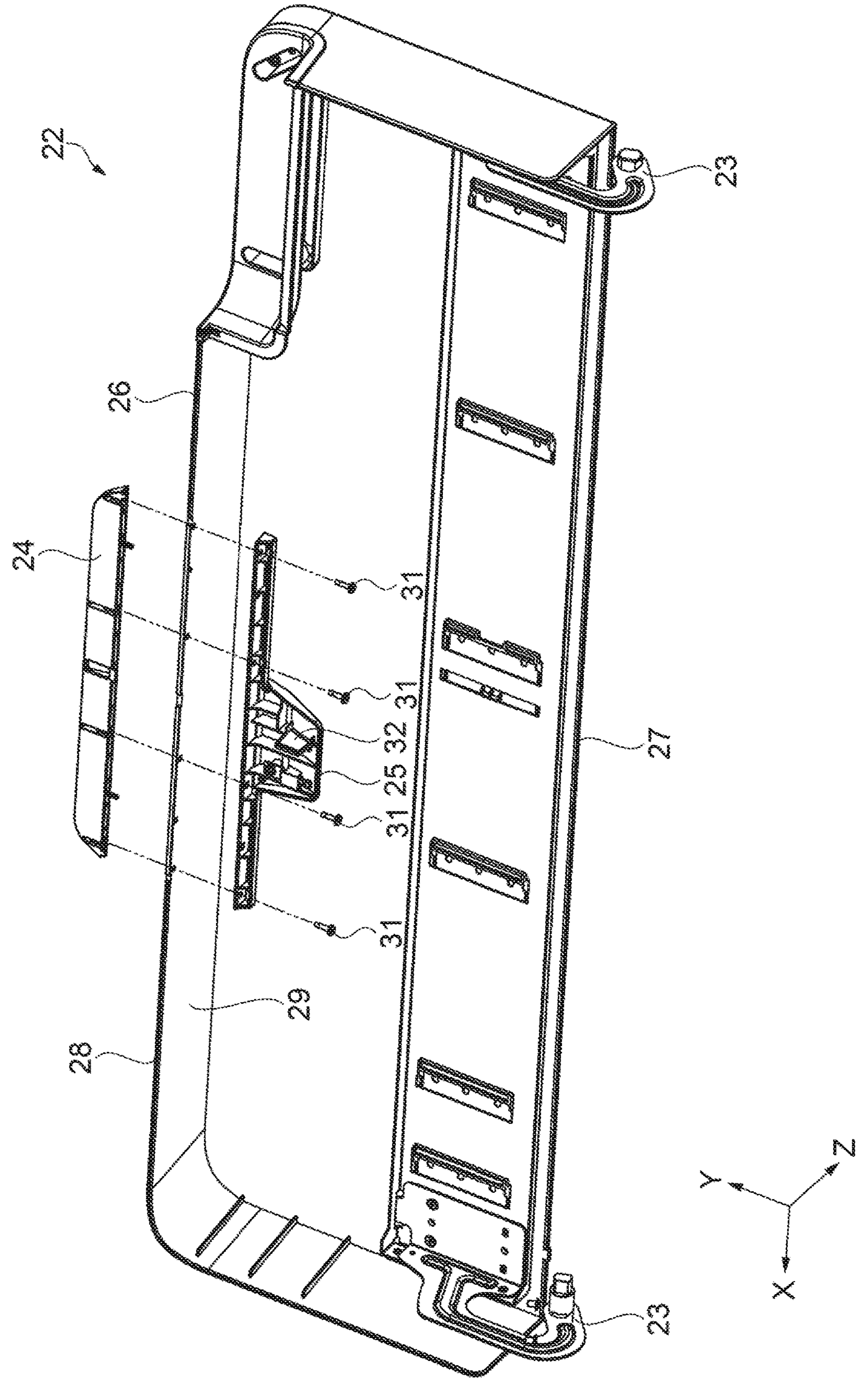
FIG. 6 is an exploded perspective view illustrating the open-close cover.

The handle 24 and the second handle 25 are coupled to each other by a screw 31 with the front side wall 28 of the lid member 26 being interposed between them, as illustrated in FIG. 6. That is, the handle 24 and the second handle 25 are coupled to each other with the open-close cover 22 being interposed between them. Since the handle 24 and the second handle 25 are coupled to each other by the screw 31, the handle 24 and the second handle 25 are formed in an integral manner.

The lid member 26 has optical transparency. The optical transparency is a property with which at least a portion of visible light is passed through. The lid member 26 serves as one example of a transparent portion. Since the lid member 26 has the optical transparency, it is possible to easily visually recognize the inside of the outer packaging 2 through the lid member 26 in a state in which the open-close cover 22 is closed. The handle 24 provided at the lid member 26 is configured such that the length thereof in the Z direction is short. Thus, when the inside of the outer packaging 2 is visually recognized from the front side wall 28, the handle 24 is less likely to block the visual recognition. For example, it is possible to visually recognize the printing unit 3 illustrated in FIG. 3 in a state in which the open-close cover 22 is closed. This makes it possible to easily know an abnormality of operation of the printing unit 3 in a state in which the open-close cover 22 is closed.

Figure 7:
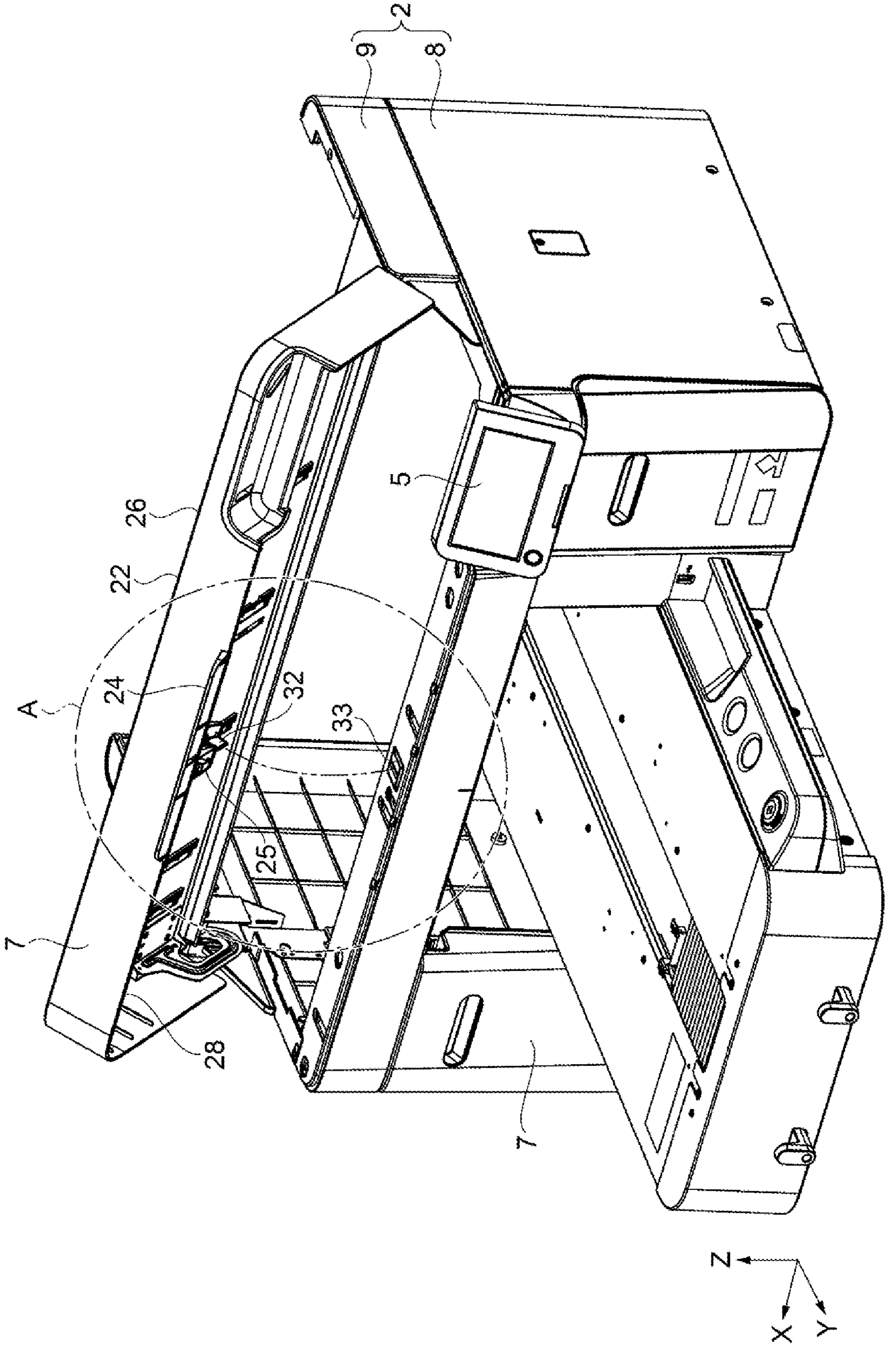
FIG. 7 is a perspective view illustrating an outer packaging and an operating panel.

As illustrated in FIG. 6, the second handle 25 includes a detection plate 32. The detection plate 32 protrudes in the −Z direction from the second handle 25. The detection plate 32 is a plate-shaped member that extends downward in the −Z direction from the second handle 25. The detection plate 32 has a plate-like shape along the Y-Z plane. As illustrated in FIG. 7, an open-close sensor 33 is disposed at a position that is opposed to the second handle 25 in a state in which the open-close cover 22 is closed. The open-close sensor 33 is a sensor configured to output open-close information indicating that the open-close cover 22 is open or close. As the detection plate 32 is provided at the second handle 25, it is possible to achieve excellent responsiveness in detecting the open/close state of the open-close cover 22 when the open-close cover 22 is opened or closed using the second handle 25 or the handle 24 coupled to the second handle 25.

Figure 8:
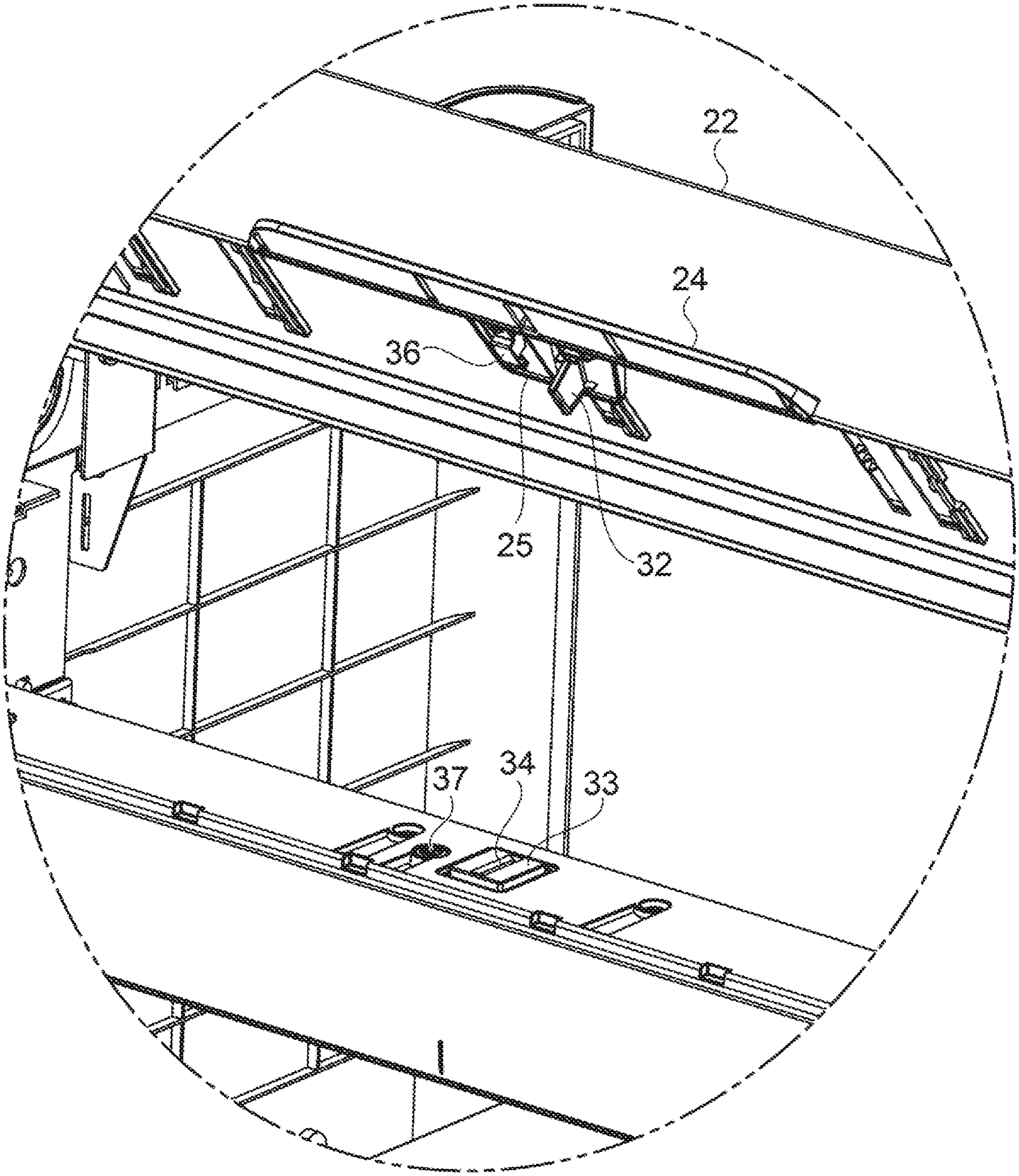
FIG. 8 is an enlarged view of the portion A in FIG. 7.

FIG. 8 is an enlarged view illustrating the portion A in FIG. 7. As illustrated in FIG. 8, the open-close sensor 33 includes a slit 34 formed at a position that is opposed to the detection plate 32. As the open-close cover 22 is closed, the detection plate 32 is inserted into the slit 34. The open-close sensor 33 is an optical sensor. The open-close sensor 33 includes a light emitting unit and a light receiving unit. The light emitting unit and the light receiving unit are opposed to each other with the slit 34 being interposed between them. The light emitting unit emits light toward the light receiving unit. Upon receiving light from the light emitting unit, the light receiving unit outputs a signal. When light from the light emitting unit is blocked, the light receiving unit stops outputting the signal. In the printing apparatus 1, when the detection plate 32 blocks light from the light emitting unit toward the light receiving unit, the output signal from the open-close sensor 33 changes. On the basis of this change in the output signal, it is possible to detect the presence or absence of the detection plate 32.

The printing apparatus 1 employs the output signal from the open-close sensor 33 as the open-close information. The open-close sensor 33 outputs the open-close information on the basis of a result of detection of the detection plate 32. This makes it possible to know the open/close state of the open-close cover 22 on the basis of the open-close information that the open-close sensor 33 outputs. In the printing apparatus 1, when the open-close sensor 33 detects the detection plate 32, the open-close information indicating that the open-close cover 22 is closed is outputted from the open-close sensor 33. On the other hand, when the open-close sensor 33 does not detect the detection plate 32, the open-close information indicating that the open-close cover 22 is open is outputted from the open-close sensor 33. On the basis of the information, it is possible to let a user know the open/close state of the open-close cover 22. For example, when the open-close sensor 33 outputs the open-close information indicating that the open-close cover 22 is open, the printing apparatus 1 notifies a user that the open-close cover 22 is open. On the basis of this notification, a user is able to take appropriate actions such as closing the open-close cover 22 Note that the detection plate 32 may be configured to make detection in a mechanical manner.

In addition, a metal plate 36 is disposed at the second handle 25, as illustrated in FIG. 8. The metal plate 36 is fixed at the second handle 25. The metal plate 36 is made of a metal including a magnetic body such as iron, nickel, or cobalt. A magnet 37 is disposed at a position that is opposed to the metal plate 36 in a state in which the open-close cover 22 is close. When the open-close cover 22 is closed, the metal plate 36 is opposed to the magnet 37. In a state in which the open-close cover 22 is close, drawing force due to the magnet 37 acts on the metal plate 36. This makes it possible to easily keep the state in which the open-close cover 22 is closed. Thus, when vibration or shock acts on the printing apparatus 1, it is possible to easily prevent the open-close cover 22 from opening.

What is claimed is:

1. A printing apparatus comprising:
- a head configured to perform printing on a medium; and
- an outer packaging configured to accommodate the head, wherein
- the outer packaging includes an open-close cover that constitutes a portion of an upper surface of the outer packaging, and
- the open-close cover is configured to rotate upward with one end side of the open-close cover being a fulcrum, and includes an inner-side handle provided at an inner side of the open-close cover, the inner-side handle extends towards the fulcrum with a protrusion portion of an outer-side handle, which is disposed at a position that is opposed to the inner-side handle, extending in a direction away from the fulcrum.

2. The printing apparatus according to claim 1, wherein the inner-side handle and the outer-side handle are coupled to each other with the open-close cover being interposed therebetween.

3. The printing apparatus according to claim 1, wherein the inner-side handle and the outer-side handle are integrally formed.

4. The printing apparatus according to claim 1, wherein the inner-side handle is provided at another end side of the open-close cover that is an opposite side from the one end side.

5. The printing apparatus according to claim 4, further comprising:
- a sensor provided at a position that overlaps with the other end side of the open-close cover in a state in which the open-close cover is close, the sensor being configured to output open-close information indicating whether the open-close cover is open or close, wherein
- the inner-side handle includes a detection plate to be detected by the sensor, and the sensor outputs the open-close information on a basis of a result of detection of the detection plate.

6. The printing apparatus according to claim 1, wherein the open-close cover includes a transparent portion made of a material having optical transparency.

* * * * *